F. D. SMALL.
LEVEL.
APPLICATION FILED APR. 16, 1917.

1,256,737.

Patented Feb. 19, 1918.

Inventor
Firman D. Small

By *[signature]*

Attorney.

UNITED STATES PATENT OFFICE.

FIRMAN DELL SMALL, OF ATTICA, INDIANA.

LEVEL.

1,256,737.  Specification of Letters Patent.  Patented Feb. 19, 1918.

Application filed April 16, 1917. Serial No. 162,283.

*To all whom it may concern:*

Be it known that I, FIRMAN D. SMALL, a citizen of the United States, residing at Attica, in the county of Fountain and State of Indiana, have invented certain new and useful Improvements in Levels, of which the following is a specification, reference being had therein to the accompanying drawing.

This invention relates to improvements in levels, designed particularly for the use of masons, carpenters and other mechanics in laying out operations.

Levels of ordinary construction are provided with a flat base on which they are intended to be supported in use. This requires that a supporting surface of adequate area be provided if none exists at the proper point, and that such surface have a perfectly level plane in order to secure proper results. If the supporting plane or surface is not level, the instrument must be brought to a level position by lifting it at one end. By this means the other end of the level is made the fulcrum or support for holding the weight of the instrument, and if the instrument is to be maintained in a fixed position it must be either held radially by the operator or the elevated end suspended. If, after the instrument has been used to take a certain level, it is to be changed or rotated to take another level from the original position noted, the center of the instrument is either raised or lowered, and consequently a second correct level cannot be taken without another adjustment.

The object of the present invention is to provide a level having a reduced supporting surface which adapts it to be rested upon any convenient support whether of large or small area, and which further adapts the instrument to be turned or rotated in a convenient manner to perform a series of leveling operations without the necessity of more or less laborious adjustments for each leveling action.

The invention consists of the features of construction, combination and arrangement of parts, hereinafter fully described and claimed; reference being had to the accompanying drawing, in which:—

Figure 1:
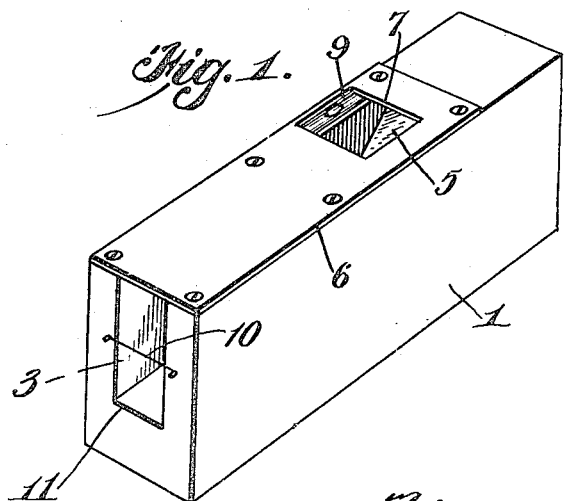
Figure 1 is a perspective view of a spirit level constructed in accordance with my invention.

Referring to the drawing, my improved level comprises a body or stock 1, comprising an oblong rectangular block of wood or other suitable material. This block is provided in its upper side with a longitudinally extending sight or light channel 2 opening through one end of the block, as at 3, and terminating at a point between the transverse center and opposite end of the block in an inclined or sloping surface 4 upon which is placed a correspondingly inclined mirror or reflector 5. The body of the channel 2 is closed by a cover plate 6, made of metal or other suitable material, and which is provided above the reflecting mirror 5 with a sight opening 7. Formed in one of the side walls of the channel immediately beneath the sight opening 7 is a recess 8 in which is fitted a bubble tube 9 of any of the forms in common use. This bubble tube is arranged at one side of the channel 2, in order that the object reflected in the mirror may be plainly seen by the operator looking downward through the sight opening. Extending across the forward or open end 11 of the channel 2 is an indicator or sight element 10, which may be an ordinary hair line wire, secured in postion in any suitable manner. Projecting from the base or stock 1, about in vertical alinement with the tube 9 is a supporting peg or projection 12, made of wood, metal or other suitable material, said peg being provided with a tapered or reduced lower end 13 and fitted or otherwise suitably secured in a recess 14 in the bottom of the stock.

Figure 2:
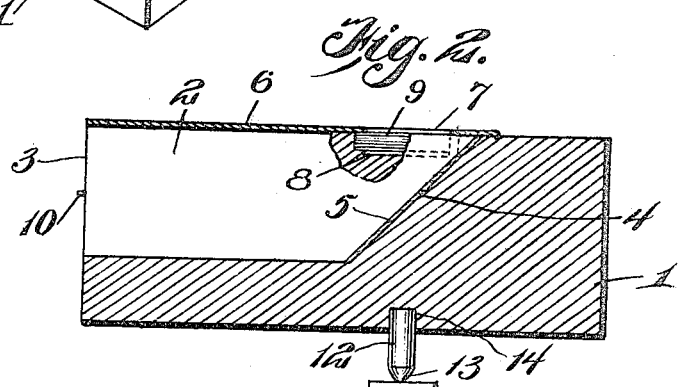
Fig. 2 is a vertical longitudinal section through the same, showing the level mounted upon a support for use.
Figure 3:
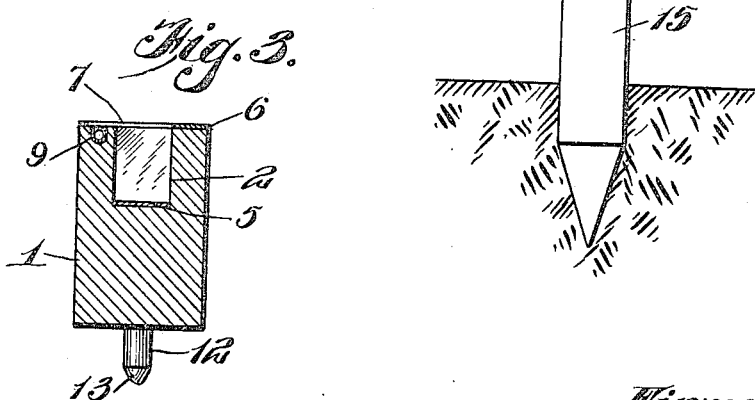
Fig. 3 is a vertical transverse section through the level.

The reduced surface 13 of the peg 12 is adapted to rest upon a supporting peg or other object 15, which sustains the level in position to use while it is held in the hand of the operator, and to adapt the level to be turned or rotated on the peg 12 as an axis for various leveling operations. As an example of one mode of employing the device, it is supposed that a mechanic desires to level the four corners of a building. In addition to the four corner stakes, he will drive one, the stake 15, on which to place the instrument for use. The instrument is supported upon this stake 15 as shown in Fig. 2 and pointed in the direction of one of the corner stakes. The operator then, while holding the instrument in his hand, moves it in a vertical plane until the bubble in the level tube shows that the instrument is level. The point where the projected image of the cross hair 15 falls on the corner stake is then marked by an assistant, after which the level is turned to successively point in the several directions of the different corner stakes which are marked in this way, thus completing the operation. It is to be understood that in this work the instrument is held in the hand of the operator, whereby it is guided and maintained in a correct position, the peg 12 with its reduced surface 13 allowing the instrument to be freely turned in any direction and leveled with a minimum amount of time and effort, the peg 12 also allowing the instrument to be placed for various operations upon a stake as described, a pile of brick, a rock or other instrument, whether level or not. The convenience of the instrument in thus obviating the necessity of employing a broad level support, and in enabling it to be turned or rotated to point in any direction, as well as to be held and guided in the hand of the operator, will accordingly be appreciated and its advantages in saving time and labor in laying out work readily understood.

Having described my invention, I claim:

A spirit level including a stock having a bubble tube mounted therein between its transverse center and one end thereof, and a single supporting peg depending from the base of the stock and having its line of support disposed so that a plane thereof will intersect said tube, said peg forming a support which permits of pivotal and unlimited tilting movements when the peg is mounted upon an object.

In testimony whereof I hereunto affix my signature in the presence of two witnesses.

FIRMAN DELL SMALL.

Witnesses:
HENRY C. KARST,
DUD JAYNES.

Copies of this patent may be obtained for five cents each, by addressing the "Commissioner of Patents, Washington, D. C."